June 27, 1944. G. C. MELVIN ET AL 2,352,216
AUTOMATIC MINIATURE RADIO RANGE EQUIPMENT
Filed July 13, 1943 4 Sheets-Sheet 1
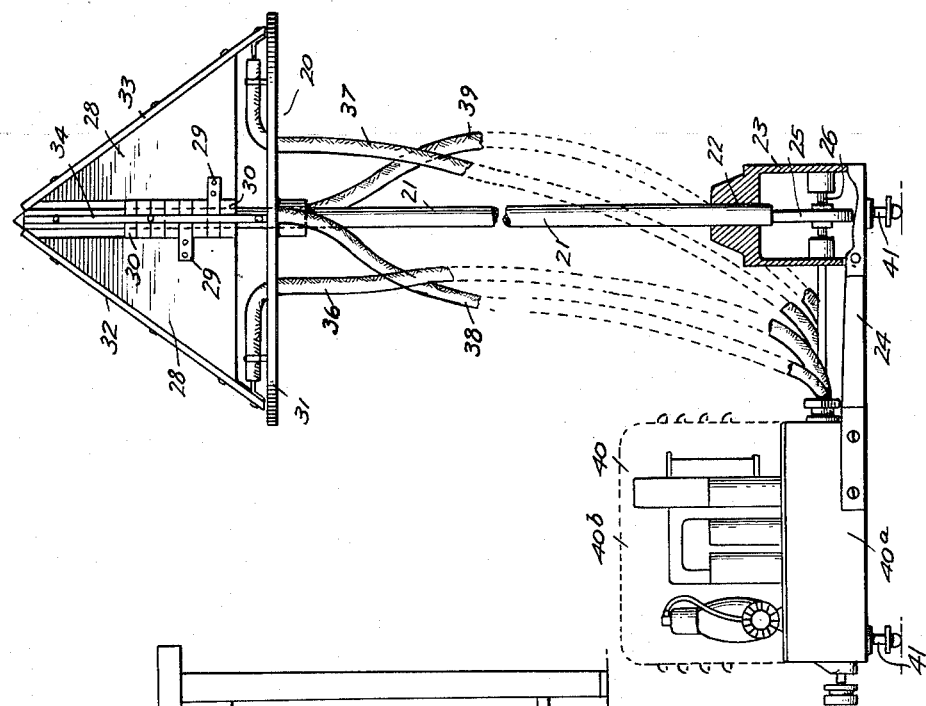
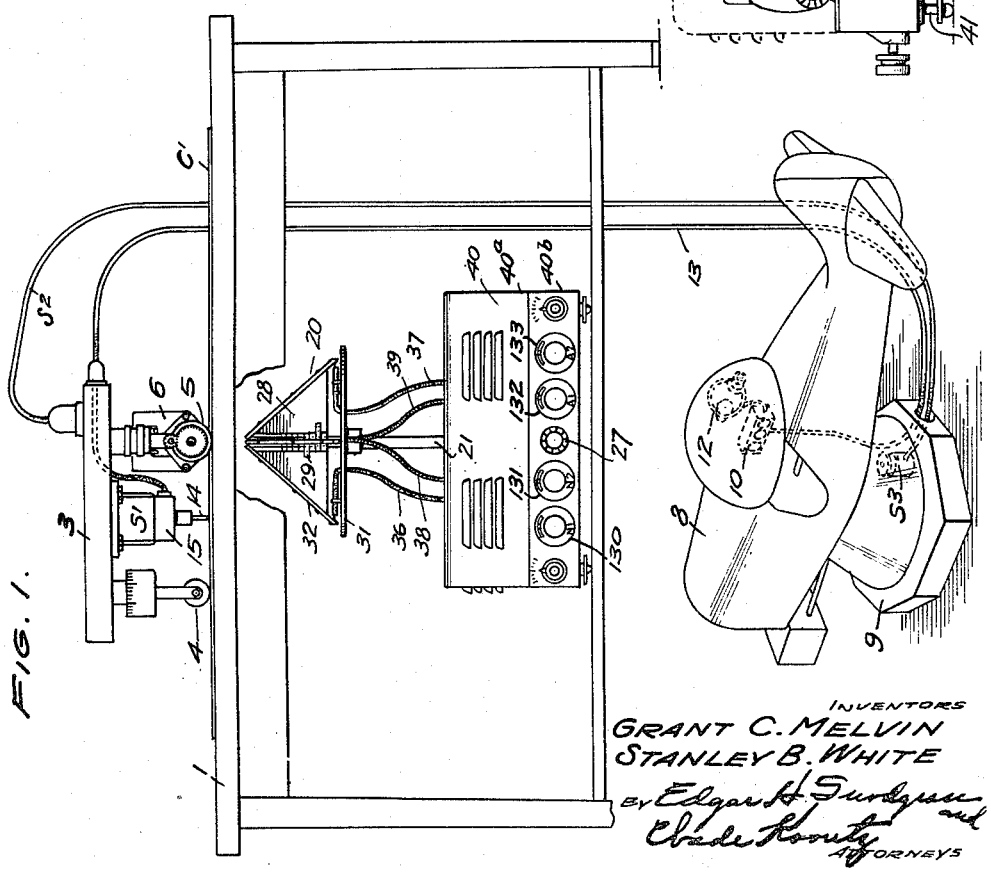
INVENTORS
GRANT C. MELVIN
STANLEY B. WHITE June 27, 1944.  G. C. MELVIN ET AL  2,352,216
AUTOMATIC MINIATURE RADIO RANGE EQUIPMENT
Filed July 13, 1943  4 Sheets-Sheet 2
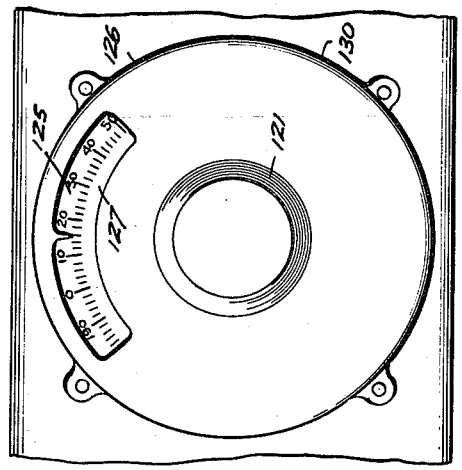
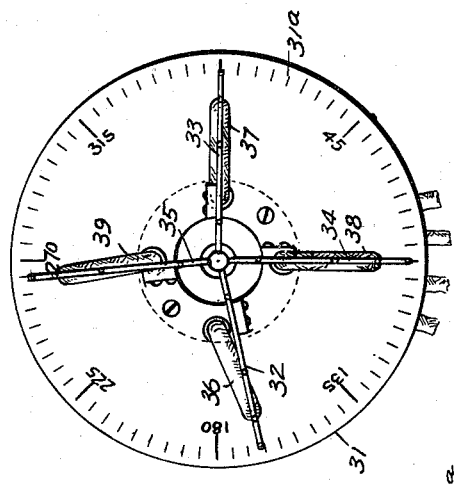
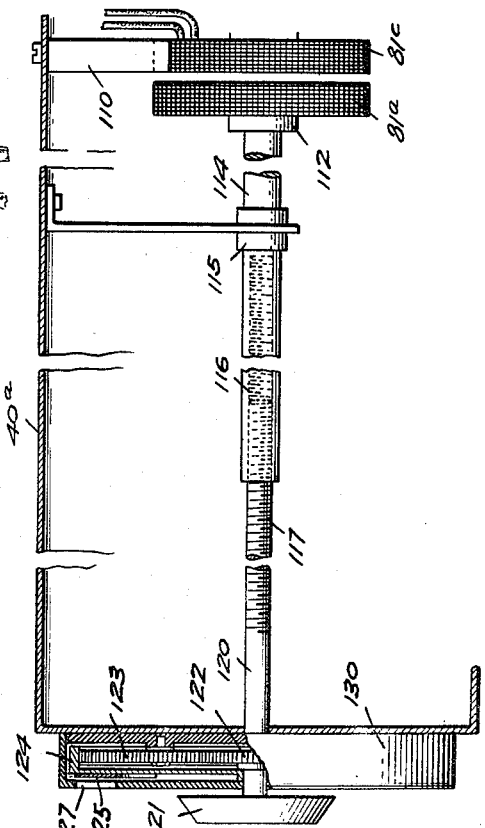
INVENTORS
GRANT C. MELVIN
STANLEY B. WHITE
BY
ATTORNEYS

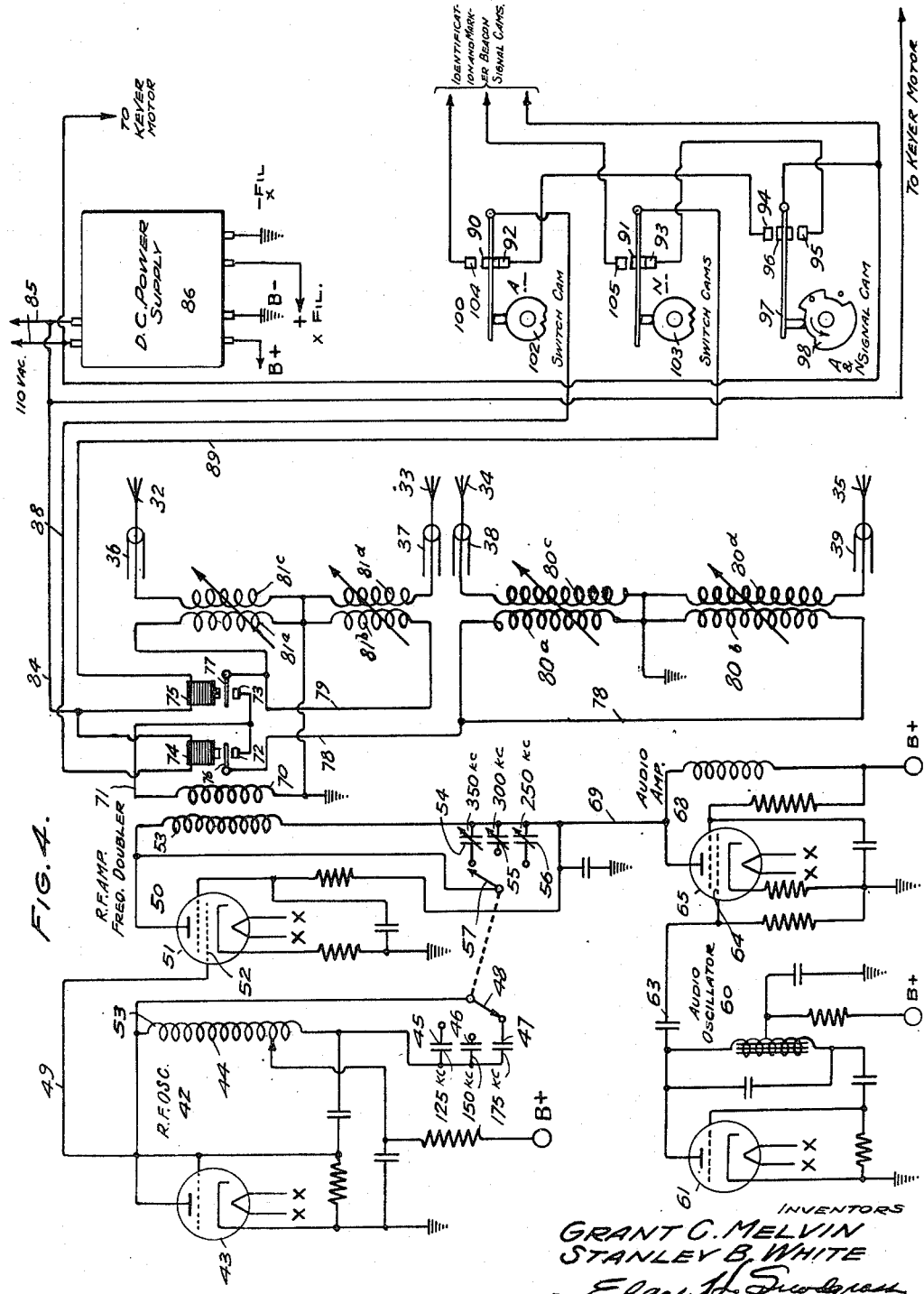

June 27, 1944.        G. C. MELVIN ET AL        2,352,216
AUTOMATIC MINIATURE RADIO RANGE EQUIPMENT
Filed July 13, 1943        4 Sheets-Sheet 4
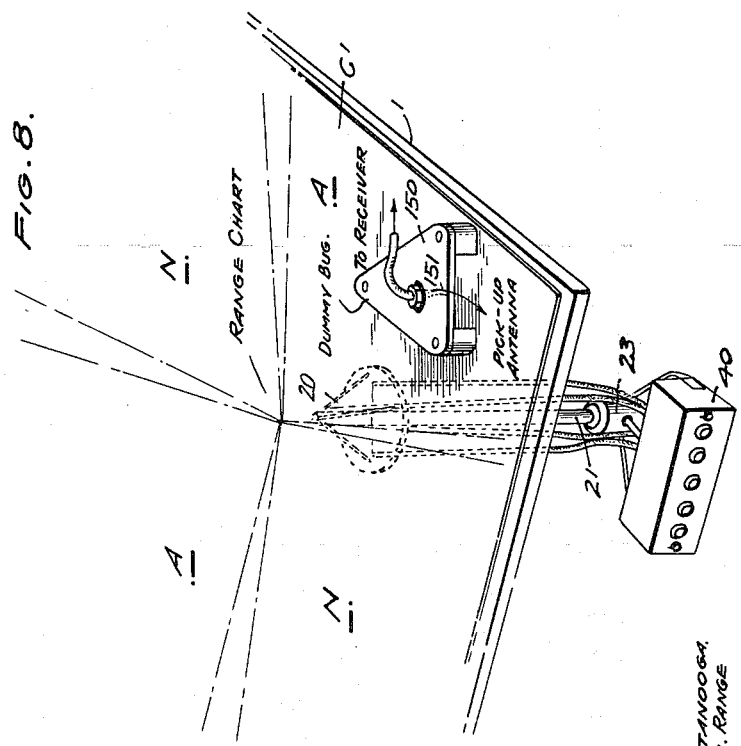
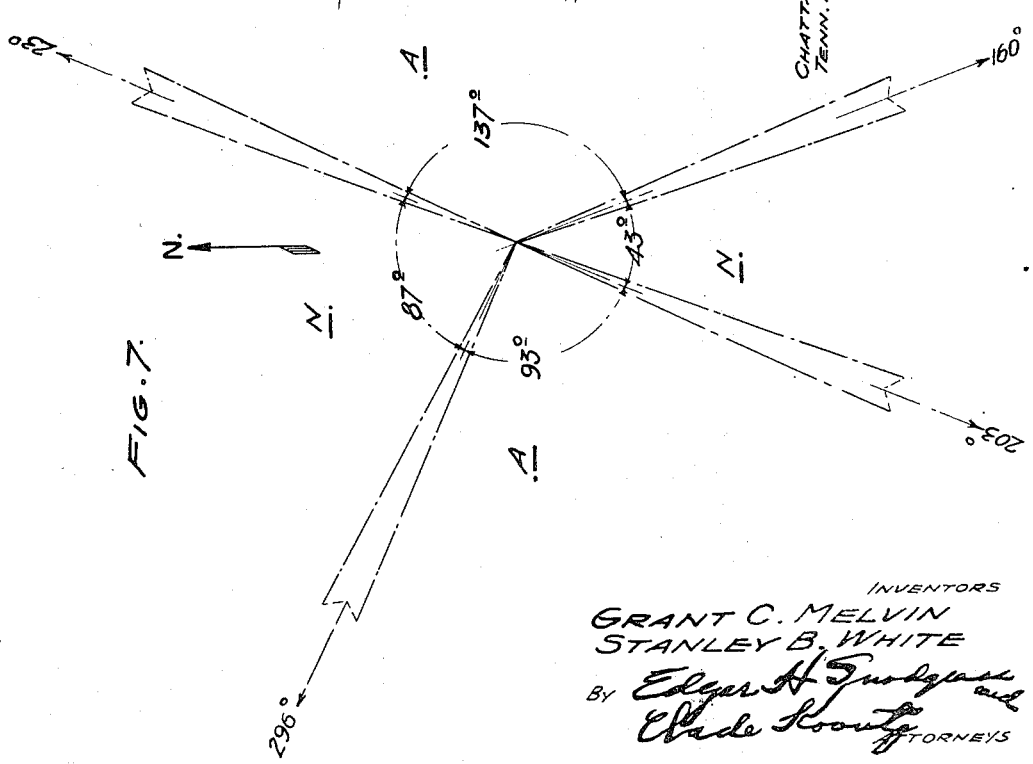
INVENTORS
GRANT C. MELVIN
STANLEY B. WHITE Patented June 27, 1944

2,352,216

UNITED STATES PATENT OFFICE 2,352,216

AUTOMATIC MINIATURE RADIO RANGE EQUIPMENT

Grant C. Melvin and Stanley B. White, Dayton, Ohio

Application July 13, 1943, Serial No. 494,480

8 Claims. (Cl. 35—12)

(Granted under the act of March 3, 1883, as amended April 30, 1928; 370 O. G. 757)

The invention described herein may be manufactured and used by or for Government for governmental purposes, without the payment to us of any royalty thereon.

This invention relates to improvements in automatic miniature radio range equipment such as disclosed in the copending application of Raymond K. Stout et al., Serial No. 320,878. Apparatus constructed in accordance with the disclosure of the afore-noted application includes an audio frequency modulated oscillator whose signal output is keyed and fed to a transmitting antenna arrangement consisting of pairs of wires fixed to a fibre center piece which is secured beneath the trainer table and adapted to radiate a radio range signal pattern over the trainer table surface. A conventional course recorder such as generally employed with aviation ground training devices of the character of the Link trainer, and controlled by such a trainer, is provided with a pick-up antenna which is adapted to pick up radio range signals from the signaling field and to transmit the same to a conventional radio receiver placed in the trainer cockpit. Since the radio range signal pattern radiated over the trainer table duplicates, in miniature, an actual radio range, the radio range signals received by the student in the trainer cockpit depend upon the position of the recorder with respect to the quadrants of the radio range signal field in exactly the same manner as in an aircraft flying on an actual radio range. Apparatus constructed in accordance with the disclosure of the afore-mentioned application has been very successful and constitutes a big improvement over the manual operation of radio range signalling equipment heretofore generally employed in conjunction with ground training apparatus such as the Link trainer. With the type of antenna arrangement above described, however, certain difficulties were encountered in attempting to duplicate radio range signal patterns where two or more of the on-course signal legs made small angles with each other such as in the Chattanooga range illustrated in Fig. 7 of the appended drawings. Further, the equipment disclosed in the afore-mentioned application employed a self-excited radio frequency oscillator and had the respective antenna pair leads connected across the oscillator, which required very careful matching of capacities in the respective antenna circuits to prevent variation of frequency and phasing of the signal transmitted by the respective antenna pairs.

Continued development work on apparatus such as disclosed in the afore-mentioned application has resulted in improvements therein such that it is now possible to duplicate any radio range pattern desired well within the orders of accuracy which exist on actual radio ranges as employed on the airlines. The present invention also provides very simple and rapid means for changing from one type of radio range pattern to another by means of adjustable controls.

The present invention employs an antenna arrangement somewhat similar to that disclosed in the afore-mentioned application, and consists of four metal rods or conductors placed beneath the trainer table and so arranged that the lengths of the rods lie in the common surface of the cone, but differs from the prior disclosure in that the antenna rods are so supported that they may be set at any desired angle in azimuth with respect to each other, means being provided to indicate the angular position of each of the antenna rods. The antenna rods are fed by shielded conductors in a particular manner from a transmitter unit which incorporates means for varying the voltage of the modulated radio frequency signal currents fed to each antenna rod. The means for varying the angular setting of the antenna rods plus the means for varying the voltage of the signal current supply to each antenna rod in combination form a distinct novel feature whereby any radio range pattern desired can be duplicated.

In accordance with the present invention the antennas are fed from the transmitter by low capacity shielded or co-axial cables in which the center feed conductor is of stainless steel wire of about No. 30 size and the antenna rods are fed from their outer ends so that the over-all capacity of the antenna system is maintained very low, and further no appreciable disturbing effects arise because of the angular adjustment of the antenna rods with respect to each other. A further novel feature of the present invention consists in using an untuned antenna arrangement; that is, the antennas are operating at a frequency far removed from their natural resonant frequency so that it becomes possible to control the voltage in the respective antenna rods without appreciably affecting the phase relation of the voltages in the respective antenna pairs. It was found that, contrary to what might be expected, maximum efficiency could be obtained only by employing a nonresonant antenna system because, when operated in a resonant condition, leakage currents build up in the antenna system to destroy the proper out-of-phase relation of the currents in the respective antenna pairs.

It is the principal object of this invention to provide radio range equipment for use with aviation ground trainers whereby a miniature radio range may be created over a trainer table or the like by transmitting equipment which is so constructed and arranged that the on-course signal legs of the radio range pattern may be shifted with respect to each other to duplicate any desired range pattern.

It is a further object of the invention to provide in a miniature radio range device for use with aviation ground trainers, a transmitting antenna system wherein each antenna element may be angularly adjusted in azimuth as desired, a transmitter unit associated with the antenna system for energizing the same, and means associated with the transmitter for varying the voltage of the respective currents fed to the antenna pairs.

It is another object of the invention to provide, in a miniature radio range device of the character described, a transmitter and associated antenna assembly in which the antenna system is operated at a frequency remote from its resonont frequency, means being provided for isolating the antenna system from the oscillators of the transmitter, whereby changes in the capacity of the antenna system are prevented from causing a change in frequency or phase relation in the radio range signal field radiated from the antenna system.

It is a further object of the invention to provide a novel means for testing and adjusting the radio range pattern to agree with a predetermined desired pattern such as drawn on a chart, to be used in combination with a ground trainer recorder.

Other objects and features of the invention more specifically pointed out above will become apparent by reference to the detailed description hereinafter given and to the appended drawings in which:

Fig. 1 is a diagrammatic illustration of the arrangement of the various components of the invention as employed with an aviation ground trainer;

Fig. 2 is a side elevation, partly in section, of the transmitting antenna assembly illustrated in Fig. 1;

Fig. 3 is a top plan view of the antenna system of Fig. 2;

Fig. 4 is a schematic wiring diagram illustrating the various components of the transmitter;

Fig. 5 is a view, partly in section, illustrating the details of a variable link coupling device employed in the transmitter of Fig. 1 for varying the voltage fed to the respective antenna rods;

Fig. 6 is a front elevation of the device illustrated in Fig. 5;

Fig. 7 is a diagrammatic illustration of the Chattanooga radio range illustrating a type of range pattern which is typical of the extent of application of the present invention; and Fig. 8 is an isometric sketch illustrating a novel means for testing conformance of the pattern of the signal field transmitted over the trainer table with respect to a predetermined desired radio range pattern.

Referring now to Fig. 1, the reference numeral 1 illustrates an aviation ground trainer table having a radio range chart $C_1$ placed on the surface thereof, over which a conventional course recorder 3 of the type widely employed in aviation ground training apparatus is adapted to move in translation. The recorder 3 is provided with a marker roller 4 and a pair of driving rollers 5, the latter being propelled by synchronous electric motors such as at 6, and the rollers 4 and 5 being interconnected by gearing (not shown) for simultaneous steering movement. The heading of the course recorder 3 is determined by means of an autosyn receiver $S_1$ mounted on the recorder frame, which is electrically connected by means of a cable $S_2$ to a corresponding autosyn transmitter $S_3$ mounted in the base of the trainer, generally indicated by the reference numeral 8. The trainer 8 is tiltably and rotatably mounted for movement with respect to the base 9 under the control of the student occupant and may be a trainer of the character such as disclosed in United States Patents 2,099,857 and 1,825,462 granted to Edwin A. Link, Jr. A conventional radio receiver 10 is mounted within the trainer cockpit and is provided with a head set 12, worn by the student and is connected by means of a cable 13 to a pick-up antenna 14 secured to a shielding and insulating mounting 15 centrally disposed with respect to the recorder wheels 4 and 5. A transmitting antenna assembly generally indicated by the reference numeral 20 is positioned beneath the undersurface of the table 1 and is adapted to be energized by means of a transmitter unit generally indicated by the reference numeral 40 such that the antenna assembly radiates a radio range signal pattern above the surface of table 1. As is well known in the art, the recorder 3 is propelled over the surface of the trainer table at a speed proportional to an assumed air speed of the trainer 8 and is directionally controlled by the trainer such that the movement of the recorder relative to the chart $C_1$ represents the assumed flight course of an airplane in flight represented by the trainer. As the recorder moves in translation over the surface of the chart $C_1$, the pick-up antenna 14 will receive radiant energy signals from the radio range field over the trainer table and the radio range signals will be transmitted to the trainer cockpit and received as audible signals in the head phones 12, to be interpreted by the student in terms of position of the assumed flight of the aircraft with respect to an assumed radio range transmitting station. The general organization thus far described is similar to that disclosed in the afore-noted copending application Serial No. 320,878, and the present invention relates to specific improvements over the disclosure of the afore-mentioned application, which improvements will now be described.

*The transmitting antenna system*

By reference to Fig. 2, it is seen that the antenna assembly generally indicated by reference numeral 20 in Fig. 1 comprises a vertically extending support rod 21 made of Bakelite or other insulating material, which is slidably but non-rotatably mounted in a bore 22 serving as a bearing and formed in a housing 23 which is rigidly supported by means of a base frame 24. A cam 25 in the form of an eccentric is mounted on a shaft 26 rotatably journalled in the housing 23 and extending laterally therefrom for manual operation by a knob 27 shown in Fig. 1. By rotation of shaft 26 the antenna support rod 21 may be moved through a limited distance in either direction to raise or lower the antenna assembly with respect to the trainer table as seen in Fig. 1 for the purpose of varying the diameter of the radio range cone of silence in the plane of the chart C₁ of Fig. 1, this feature being broadly contemplated in the afore-mentioned Stout et al. application Serial No. 320,878 and forming no part of the present invention.

Adjacent the upper end of the supporting rod 21 are four triangular plates 28 made of insulating material, each provided with a hinge lug 29 rotatably supported by the rod 21, the various hinge lugs being separated by and retained in assembled relation by means of thick spacers 30, also made of insulating material and secured to the support rod 21 by means of dowel pins or the like, the hinge assembly being such that the plates 28 may be angularly rotated about the axis of the rod 21, and sufficient friction being present to maintain the same in any adjusted position. A large disc 31 made of insulating material is secured to the support rod 21 immediately below the plates 28, and on its upper surface is engraved an azimuth scale 31a as seen in Fig. 3 so that the angular setting of each of the plates 28 may be readily apparent by visual inspection with respect to the azimuth scale 31a. Each of the triangular plates 28 has mounted thereon a respective metal antenna rod indicated by reference numerals 32 to 35 inclusive (see also Fig. 3), the antenna rods lying on the hypotenuse of the triangular plates so that they all lie in the lateral surface of a cone whose apex intersects the axis of the vertical support rod 21, the included angle of the cone being approximately 90°. The antenna rods form two related pairs, one pair being rods 32 and 33 and the other pair being rods 34 and 35; and each member of the pair is fed from a transmitter by a shielded conductor, rods 32 and 33 being fed by conductors 36 and 37 respectively, and rods 34 and 35 being fed by conductors 38 and 39 respectively. The antenna feed conductors are made from fine stainless steel wire approximately No. 30 in size, and are electrically connected to the outer ends of the respective antenna rods, this being an important feature since the connection of the antenna is somewhat remote from the cone of silence and hence movement of the antenna rods does not tend to distort the cone of silence, and further, the movement of the antenna rods, due to the low capacity of the antenna sytem, has little or no effect on changing, due to capacity effects, the frequency or phase angle of the radio range signals transmitted by the respective pairs. The transmitter employed to feed the antenna pairs will now be described.

The transmitter

As seen in Figs. 1 and 2 the antenna feed conductors are associated with a transmitter unit generally indicated by the reference numeral 40, the transmitter including an audio frequency oscillator and amplifier and a radio frequency oscillator and amplifier so coupled as to constitute as a source of modulated radio frequency signal currents, keying means, antenna link coupling means, and a power supply, all constructed from commerciably available radio components such as tubes, transformers and the like mounted on a lower chassis base 40a and enclosed by a covering 40b. The transmitter arrangement including its various components can best be understood by reference to Fig. 4, in which figure the various radio tubes, condensers, relays and the like are indicated by conventional symbols. As seen in this figure, the radio frequency oscillator generally indicated by the reference numeral 42 includes a triode type vacuum tube 43 coupled in a conventional radio frequency oscillator circuit, including a tapped inductance 44 and a plurality of variable condensers 45, 46 and 47 in the tuned circuit of the oscillator, the condensers being adapted to be separately switched into the circuit with the inductance 44 by means of a switch arm 48 so that the oscillation frequency may be made any one of three values, 125, 150 and 175 kilocycles, as desired. The radio frequency output of the oscillator 42 is led by means of a conductor 49 to the control grid 52 of a pentode type vacuum tube 51 which forms a part of a conventional frequency doubler and amplifier generally indicated by the reference numeral 50. The output of the amplifier and the doubler 50 appears in a tank coil 53 which forms a part of the resonant circuit thereof and which may be connected to include any one of three band switching variable condensers 54, 55 or 56 respectively by means of a switch arm 57. The switch arm 57 is adapted to be operated in unison with switch arm 48 by means of a suitable control knob or the like (not shown). The amplifier and doubler 50 is adapted to be tuned by means of any one of condensers 54 to 56 inclusive, such that it amplifies the second harmonic of the fundamental frequency of the radio frequency oscillator 42 so that when the fundamental frequency of oscillator 42 is 125 kilocycles, the radio frequency output appearing in tank coil 53 will have a frequency of 250 kilocycles, and in like manner the doubler 50 will double the operating frequency of the output of the oscillator 42 for any of its predetermined selected values. This arrangement of an oscillator and a frequency doubler acting as an amplifier is per se old in the art.

An audio frequency oscillator generally indicated by the reference numeral 60 and including a triode type vacuum tube 61 arranged with an audio transformer and condenser to form a well-known audio oscillator circuit is so constructed as to give an output current having a frequency of 1020 cycles per second, which output current is conducted by conductor 63 to the control grid 64 of a pentode type vacuum tube 65 which is arranged as an amplifier and modulator as generally indicated by reference numeral 68, the output of which is fed into the lower end of the tank coil 53 by means of conductor 69 so that the radio frequency carrier wave in the tank coil is modulated at a constant audio frequency of 1020 cycles per second so that if uninterrupted, the signal output would be received as a continuous audible tone.

The modulated radio frequency currents in the tank coil 53 are transmitted to the coupling coil 70 inductively coupled to the tank coil and from hence the radio frequency currents are fed to the antenna system as will now be described. The upper end of the coupling coil 70 is connected by means of a lead 71 in parallel with contacts 72 and 73 of a pair of keying relays 74 and 75, the relays having contact making armatures 76 and 77 respectively to which are connected antenna feed conductors 78 and 79 respectively. The antenna conductor 78 is connected by means of parallel branches to the upper and lower ends respectively of the pair of serially arranged link coupling primary coils 80a and 80b which are grounded at their inner ends so as to form a return circuit to the grounded lower end of the coupling coil 70, and similarly the conductor 79 is connected by means of branches thereof to the upper and lower ends respectively of antenna link coupling primary coils 81a and 81b respectively. The inner ends of coils 81a and 81b are also connected to the grounded lower end of the coupling coil 70 to form a return circuit thereto. The link coupling primary 80a and 80b are variably inductively coupled to respective secondary coupling coils 80c and 80d respectively, which are grounded at their inner ends in common with the inner terminals of the primary coupling coils, and at their outer ends respectively connect to the shielded conductors 38 and 39 for connection to antenna rods 34 and 35 respectively. Similarly the antenna link coupling coils 81a and 81b are variably inductively coupled to secondary link coupling coils 81c and 81d respectively, which at their inner ends are connected to ground in common with the inner ends of the associated primary coils and at their outer ends are respectively connected by the shielded conductors 36 and 37 to antenna rods 32 and 33 respectively.

It will be seen that upon closure of the armature 76 of relay 74 with contact 72, the modulated radio frequency current appearing in conductor 71 will be led by means of conductor 78 to the primary link coupling coils 80a and 80b, which will in turn by induction feed the radio frequency signal currents to antenna rods 34 and 35 for radiation into space, the link coupling circuits being so arranged that the signals appearing in rods 34 and 35 will be 180° out-of-phase for the purpose of creating the proper radio range pattern as is well known in the art, and by successive opening of contact between armature 76 and contact 72 of relay 74, the output to antenna rods 34 and 35 may be keyed to give any desired signal, and in the circuit as illustrated, relay 74 is keyed to form the radio range A signal dash-dot by keying apparatus later to be described. In a similar fashion, upon closure of armature 77 with contact 73 of relay 75, modulated radio frequency current from conductor 71 will be fed to the primary link coupling coils 81a and 81b and will appear in secondary link coupling coils 81c and 81d respectively in 180° out-of-phase condition and then radiated into space for antenna rods 32 and 33. In a similar manner relay 75 may be operated to key the output to antennas 32 and 33, which in the circuit as shown are keyed to form the conventional radio range N signal dash-dot.

The keying relays 74 and 75 have the solenoid coils thereof interconnected through one pair of terminals to a conductor 84 which in turn is connected to one side of 110 volt power line 85 which is used to energize a conventional D. C. power supply 86, the output of which is employed to give the desired direct current plate supply to the respective vacuum tubes in the transmitter unit and also to give the proper current output to the cathode heaters of the respective transmitter tubes. In the drawings the connections of the various parts of the plate supply circuit have been indicated by terminals identified as B+, and similarly the cathode heater connections have been indicated by the symbol "X" and all common grounded connections have been indicated by the conventional ground symbol. The other terminals of relays 74 and 75 are respectively connected to conductors 88 and 89, which in turn are connected to contacts 90 and 91 respectively of a keying apparatus, generally indicated by the reference numeral 100, which is similar to the keying device now employed in conventional ground trainer signal apparatus. The contact 90 is adapted to be brought into engagement with a contact 92, which is electrically connected to a contact 94 of an A—N signal device, and similarly contact 91 is adapted to be brought into engagement with the contact 93 to connect conductor 89 to a contact 95 of an A—N signal device. The A—N signal device includes a contact 96 which is adapted to carry current from the 110 volt supply source 85, which contact is adapted to be brought into engagement with either of oppositely spaced contacts 94 and 95 by means of arm 97 which is actuated by an A—N signal cam 98, which is driven at a constant speed in the direction indicated by a keyer motor (not shown). With the contacts in the position as shown in Fig. 4, the high parts of cam 98 will bring contact 96 successively into engagement with contact 94 to conduct current to relay 74 in keyed impulses to make the radio signal A dot-dash. Similarly the contact 96 will be brought into engagement with contact 95 by the low parts of the A—N signal cam 98 to cause current conducted to relay 75 to be interrupted to form the N signal dash-dot so that relays 74 and 75 will respectively key the outputs to antenna pairs 34—35 and 32—33 to radiate A and N signals. The switch contacts 90 and 91 are adapted to be moved from the position as shown in Fig. 4 until they respectively engage contacts 104 and 105 due to the action of cams 102 and 103 respectively so that the relay conductors 88 and 89 may be switched from the A—N signal device to identification and marker signal cam operated keying devices not shown, so that identification and marker beacon signals may be transmitted through the antennas alternately into the N signal field and then to the A signal field in a manner similar to conventional radio range operation. The cams 102 and 103 also permit the contacts 90 and 91 to be moved to a neutral position out of engagement with either of the cooperating pair of contacts. The switching cams 102 and 103 are adapted to be operated in a timed relation by means of a ratchet drive driven by the keyer motor and not shown, so that A and N signals will be given for a predetermined time and then the circuits connected for transmission of identification and marker beacon signals. The keying apparatus as herein illustrated is conventional and per se forms no part of the present invention.

As previously noted, an important feature of the invention is the provision of means for varying the voltage supplied to the individual antenna rods, and this is accomplished by means of the variable coupling between the respective cooperating antenna link coupling coils previously described. In the present case the antenna primary coupling coils 81a and 81b are moved axially with reference to the secondary coils 81c and 81d to vary the coupling therebetween and hence to vary the output voltages as desired to antennas 32 and 33; and in a similar manner the primary coils 80a and 80b are shifted axially with respect to their associated secondary coils 80c and 80d to vary the coupling therebetween and to thereby vary the output voltage to antenna rods 34 and 35 respectively.

The means for varying the coupling in one of the antenna circuits is illustrated in Fig. 5 in which the secondary link coupling coil 81c in the form of a lattice wound inductance is secured to a stationary insulated support 110 mounted on the underside of the chassis base 40a, and the corresponding primary coil 81a is supported by a ceramic insulator 112 on the inner end of an insulating rod 114 made of Bakelite or similar material and square in cross section, which is supported in a guide 115 which permits axial movement of the rod 114 but prevents rotation thereof. The outer end of the rod 114 is internally threaded as at 116 to receive the threaded portion 117 of a shaft 120 such that rotation of shaft 120 causes axial movement of rod 114 and accordingly varies the spacing between the primary and secondary coils 81a and 81c respectively and thus varies the coupling therebetween. The shaft 120 extends through the front panel of the chassis base 40a and has a knob 121 mounted on the outer end thereof for direct manual rotation of the shaft. A small pinion gear 122 fixed to the shaft 120 meshes with an idler gear 123 which in turn meshes with an internal tooth gear 124 which is freely rotatably journalled on shaft 120, and the gear 124 is provided on its outer face with an annular dial 125 which is provided with a suitable scale calibrated to measure the relative position between the primary and secondary link coupling coils. The dial 125 is rotatable past a window opening 127 cut in a housing 126 which encloses the vernier mechanism and, as the knob 121 is rotated, the dial indicia will move relative to the index to indicate the instant coupling position of the antenna link coupling coils. The vernier assembly Fig. 5 is generally indicated by reference numeral 130 and the assemblies employed with the remaining variable link coupling coils are of identical construction and indicated in Fig. 1 by reference numerals 131 to 133 inclusive. The range of coupling movement is made about two inches, though one inch of movement will generally be adequate for tuning purposes. By means of the assemblies 130 to 133 the voltages fed to the respective antenna rods may be varied as desired, and for a predetermined radio range pattern and a constant transmitter power output, a table may be made up indicating the angular position of the respective antenna rods and a numerical coupling setting as determined from dial 125 in order to rapidly set up any desired radio range within very close limits, final adjustments being made in a manner which will now be described.

In the afore-mentioned application Serial No. 320,878 the pick-up antenna was positioned adjacent the marker wheel of the recorder so that the marker wheel trace would coincide with the position of the antenna at all times. It was found, however, that the distribution of the metal mass of the recorder with respect to the pick-up antenna had an effect of distorting the radio range signal field which was somewhat prominent when the recorder moved into the cone of silence zone so that in the present apparatus, the pick-up antenna has been centrally positioned on the recorder frame, which minimizes any distortion effects. It was found however that, in the duplication of radio ranges other than of the 90° type, the on-course signal legs were shifted somewhat because of the presence of the recorder and its metal mass in the signal field so that when the radio range signal field was accurately set up with respect to a chart on the trainer table without the presence of the recorder, the range leg angles would be shifted when the recorder was placed on the table and put in operation, and accordingly it became necessary to make a final adjustment for range leg angles including the effect of the recorder's mass. Due to the fact that the recorder wheels are sharp-edged and geared to the recorder motors, the recorder itself can not be pushed around on the chart in checking on-course signal leg angles because of the damage to the chart and scuffing of the soft brass wheels of the recorder, and further due to the slow rate of movement of the recorder, it is impracticable to check the on-course signal leg angles by operating the recorder through the electric motor drive because of the amount of time required. To overcome these difficulties, test apparatus was constructed as illustrated in Fig. 8, in which a dummy recorder 150 is made with a metal mass substantially equal to that of the standard recorder and a pick-up antenna 151 is centrally mounted on the dummy recorder, the antenna being adapted to be connected to the radio range receiver 10, Fig. 1, and the instructor using a pair of head phones connected to the receiver. By then sliding the dummy bug around on the trainer chart, the actual angular position of the on-course signal legs may be checked with respect to the chart and any final adjustment made by operation of the link coupling coil adjustment means, and in this manner the range leg angles can be accurately set to within approximately 1° of accuracy, which is equal to the degree of accuracy employed on actual radio ranges. In the setting up of the range, the cone of silence on the chart is made to coincide with the position of the cone of silence in the radio energy field transmitted from the antenna assembly 20, Fig. 1, but due to the fact that the antenna is positioned at the center of the recorder frame after alignment of the radio range with the chart, it becomes necessary to shift the chart in the direction and amount equal to the distance of the recorder marker wheel from the antenna, which in the conventional recorder now employed is 3½ inches, and when the recorder frame is orientated, the shift is made toward the north. The chart shifting is necessary so that when the recorder marker wheel is directly over the radio range station point on the chart, the pick-up antenna will be in the center of the cone of silence in the radio range signal field emanated over the trainer table, and this is possible because the course recorder frame after initial orientation retains its fixed orientation irrespective of the heading of the recorder, and hence the position of the marker wheel with respect to the radio range on the shifted map will coincide exactly with the corresponding position of the pick-up antenna with respect to the electro-magnetic radio range field.

*Operation*

The operation of the assembly of Fig. 1 is as follows. The chart $C_1$, Fig. 1, is placed on the trainer table 1 such that the cone of silence of the conventional radio range diagram on the chart will coincide as nearly as possible with the axis of the rod 21 of the antenna assembly. The various elements of the transmitter are then electrically energized through a control switch means (not shown) and the desired transmitting wave length is determined by selection of the band switching condensers associated with the oscillator and frequency doubler 42 and 50 respectively of Fig. 4, and the radio frequency oscillator 42 will then be oscillating at a fundamental frequency of, for example, 125 kilocycles, and the frequency doubler 50 will amplify harmonic of the fundamental frequency of the oscillator 42 such that the output of the amplifier 50 will be twice the fundamental frequency of oscillator 42 in the example as cited, but radio frequency oscillations in the tank coil 53 will be of the order of 250 kilocycles. The audio oscillator 60 will generate a tone having a frequency of 1020 cycles per second, which audio tone is amplified in an amplifier and modulator 68 and impressed upon the radio frequency oscillations in the tank coil 53 such that the radio frequency signal is modulated at an audio frequency of 1020 cycles per second. The modulated radio frequency current induced in the antenna link coupling coil 70 from the tank coil 53 will be keyed by the relays 74 and 75 to give an A and N signal respectively so that the signal ultimately radiating from antenna rods 32 and 33 (Fig. 4) will generate the N signal, and antenna rods 34 and 35 will generate an A signal, the keying mechanism 100 will operate to give the proper number of A and N signals to be followed by identification signals in the manner previously described.

The antenna rods are adjusted by movement of the plates 28 (Figs. 2 and 3) such that the plane of the respective antennas occur on approximately the bisectors of the angles between the on-course signal legs in the respective A and N quadrants of the radio range, for example, of the type illustrated in Fig. 7, and the variable link coupling coils 80a and 80b, etc., are adjusted such that a predetermined voltage is fed to each antenna rod as determined from a chart calibrated in accordance with the divisions of dial 125 (Figs. 5 and 6). The instructor then places the dummy recorder 150 (Fig. 8) on the range chart and connects the pick-up antenna 151 thereof to a radio receiver such as 10 of Fig. 1, and by moving the dummy recorder over the chart along the on-course signal legs the divergence of the on-course signal legs of the radiated field can be compared with the signal legs on the chart and the voltage to the respective antenna rods adjusted until the on-course signal legs in the radio field and on the chart are superimposed. Increase in voltage in an antenna rod causes an increase in the dimensions and strength of the field radiated therefrom and causes an increase in the angle between the on-course signal legs on opposite sides of the particular antenna rod, and decrease in voltage will have the opposite effect of decreasing the angle between the on-course signal legs. If the cone of silence is not properly centered, the same may be shifted laterally relative to the cone of silence on the chart by adjustment of the adjustable supporting screws 41 so that the plane of the rod 21 and the cone of silence may be tilted as desired and the diameter of the cone of silence in the plane of the chart may be adjusted by raising or lowering the antenna assembly as previously noted. After the radio range has been adjusted by the use of the dummy recorder, the actual recorder 3 of Fig. 1 may be placed on the trainer table, the chart having been shifted by an amount equal to the distance from the antenna 14 to the marker wheel 4 of Fig. 1 as previously explained. By tuning the receiver 10 of the Fig. 1 to the same frequency as the output frequency of the amplifier and doubler 50 of Fig. 4, the student will hear an A or N signal depending upon what quadrant the pick-up antenna on the recorder appears to be with respect to the radio range field emanating over the table 1. When the recorder is placed in operation in conjunction with the trainer and the same moved for example from an A quadrant towards an N quadrant, as the N is approached, the N signal will be heard in the background, and upon reaching an on-course signal leg, a continuous audible tone will be heard due to the combination of the A and N signals into a continuous note. The on-course signal leg may then be followed into the radio range station or any definite procedure followed, and the marker wheel 4 of the recorder 3 of Fig. 1 will leave a trace on the chart $C_1$ relative to the radio range diagram depicted thereon similar to the flying of an actual radio range on an airway.

At any time as so desired, the instructor may set up a new radio range in a few minutes, once the dial settings on the control units 130 to 133 inclusive (Fig. 1) have been determined and the angles of the on-course signal legs of the range are known. The provision of operating the antenna assembly at a frequency remote from the resonant frequency of the antenna provides a very sharp definition in the cone of silence and the effect of any extraneous leakage currents building up in the antenna system is substantially eliminated, and further the provision of isolating the oscillator units from the antenna by means of the amplifiers 50 and 78 (Fig. 4) prevents any small changes in capacity in the antenna system from feeding back and causing a shift in phasing or frequency in the transmitted A and N signals.

It is to be understood that particular radio circuits illustrated in Fig. 4 are merely illustrative of one type of satisfactory apparatus suitable for use in the invention, but that numerous changes may be made therein such as employing variometers in place of the axially relatively movable lattice wound inductances used in the variable antenna link coupling coils, though the arrangement as illustrated is preferred because the conductors from the coupling coils do not change their relative position during adjustment, and it is further evident that it is immaterial whether the primary or secondary link coupling coils are mounted for relative movement as long as one of the coils is stationary and the other movable, and it is apparent that the method of varying the voltage of the currents fed to the respective antennas may be varied from the means as shown, provided that the same are used in conjunction with the angular adjustment features of the antenna assembly.

It should also be understood that apparatus in accordance with the present invention may be employed for the purpose of setting up a landing runway localizer radio beam over the surface of the trainer table (Fig. 1) for use in instrument landing problems instead of creating a radio range. For this purpose only two antenna rods would be employed, one keyed for one type of signal, for example A or E, and the other keyed for N or T and fed from the transmitter in the same manner as previously described. By means of the angular adjustment of the antenna rods and the control of the voltage to each respective rod, the very narrow on-course beam may be radiated over the surface of the trainer table and the student will receive the signals picked up from a signal field thereof in the same manner as received when employing the localizer beam in instrument landing technique in an aircraft.

Although a preferred form of the invention has been illustrated and described, many changes and variations therein will become obvious to those skilled in the art as falling within the scope of the appended claims.

We claim:

1. In a miniature radio range for aviation ground trainers of the character wherein a transmitter and transmitting antenna assembly are adapted to radiate a radio range signal field over a supporting surface upon which a recorder is movable in translation and directionally controlled by an associated ground trainer, said recorder being provided with a pick-up antenna adapted to transmit radio signals to a radio receiver positioned in the trainer: the improvement which comprises a transmitting antenna consisting of individual metal rods each supported on an insulating mounting, the rods lying in the common lateral surface of a cone, said rods and insulating mountings being supported for rotation about a vertical axis and adjustable such that the rods may be set at any desired angle in azimuth with respect to each other, individual shielded conductors electrically connected to the outer ends of each of said rods, means associated with the transmitter for feeding radio signal currents to each respective one of said conductors, and manually adjustable means for individually varying the voltage of the radio signal current in each respective antenna rod.

2. The structure as claimed in claim 1, in which the resonant frequency of the transmitting antenna is made substantially greater than the maximum operating frequency of the transmitter.

3. The structure as claimed in claim 1, in which the transmitting antenna assembly is operated in a nonresonant condition and in which the transmitter unit includes a radio frequency oscillator and an audio frequency oscillator, variable antenna link coupling devices, and interconnected amplifiers interposed between said oscillators and said antenna link coupling devices, whereby changes in capacity in the antenna system will not produce a change in output frequency of the respective oscillators.

4. In a miniature radio range device for use in aviation ground trainers, a transmitting antenna assembly for radiating a miniature radio range signal field comprising a central vertical support rod made of an insulating material, a plurality of supporting hinge elements mounted on said support rod for angular adjustment about the axis thereof, a plurality of metal antenna rods each secured to one of said hinge elements, said metal rods being inclined so that they lie in the lateral surface of an upright cone having its vertex on the axis of said support rod, a disc having an azimuth scale thereon mounted on said support rod concentric therewith and adapted to cooperate with said antenna rods to indicate the relative angular settings thereof, and individual shielded low capacity antenna feed conductors each connected to one of said antenna rods at a point remote from the axis of said support rod.

5. The structure as claimed in claim 4, in which said vertical support rod is mounted at its lower end in a guide permitting movement of said support rod in a vertical plane, and manually actuated means associated with said rod and guide for adjustably moving said road whereby the antenna assembly as a whole may be raised or lowered within predetermined limits of adjustment.

6. In an automatic miniature radio range device for radiating a radio range pattern radio signal field over the surface of a recorder table of an aviation ground training device, in combination, a transmitting antenna assembly positioned beneath said table and including a plurality of antenna rods inclined to the vertical and adapted to be angularly adjusted in azimuth about a common vertical axis, shielded antenna feed conductors each electrically connected to a respective antenna rod, a radio signal generating transmitter unit including a radio frequency oscillator, an audio frequency oscillator, amplifiers connected to each oscillator, a tank coil inductance jointly fed by said amplifiers with a modulated radio frequency current, a plurality of variable inductance antenna link coupling coils inductively coupling the tank coil to the respective antenna feed conductors in related pairs, keying means for keying the output to each related pair of antenna feed conductors and means for individually varying the coupling of each of said antenna link coupling coils to thereby vary the voltage of the radio signal currents fed to each antenna rod through its associated feed conductor.

7. The structure as claimed in claim 6, in which the antenna feed conductors are electrically connected to the associated antenna rods at the extremities thereof remote from the axis of angular adjustment and the antenna capacity and inductance are made such that the resonant frequency thereof is beyond the operating frequency of the transmitter.

8. In automatic miniature radio range equipment for transmitting a radio signal field over an aviation ground trainer recorder table in any predetermined quadrantal signal field pattern duplicating in miniature an actual radio range, a transmitting antenna structure including at least four metal antenna elements arranged for angular adjustment in azimuth so as to lie respectively on the bisector of the associated signal field quadrant, a keyed output radio signal generator operatively connected to said antenna rods to supply the same in related pairs with predetermined keyed radio signal currents, and means associated with said radio signal generator for individually varying the voltage of the radio signal currents fed to each antenna rod whereby the signal strength in the signal field quadrants and the angles between the on-course signal legs between said quadrants may be altered as desired.

GRANT C. MELVIN.
STANLEY B. WHITE.